INVENTOR.
Kurt Schlesinger
BY
Norman L. Mueller
Atty.

INVENTOR.
Kurt Schlesinger
BY
Foorman L. Mueller
Atty.

Patented Dec. 29, 1953

2,664,521

UNITED STATES PATENT OFFICE 2,664,521

DEFLECTION CIRCUITS

Kurt Schlesinger, Maywood, Ill., assignor to Motorola, Inc., Chicago, Ill., a corporation of Illinois Application November 7, 1951, Serial No. 255,170

19 Claims. (Cl. 315—22)

The present invention relates to television receiving circuits and more particularly to improvements in the focus and deflection circuits of a television receiver.

Development research in the television receiver field has been directed towards circuit refinements which improve the quality of the reproduced picture and/or which improve the efficiency of the circuits while maintaining picture quality, to thus reduce the number of circuit components. Recent developments in the television industry have led to the use of larger direct view picture tubes and the indications are that still larger direct view picture tubes may be used. In order to keep the total length of the picture tube within reasonable limits and at the same time increase the viewing size of the picture the horizontal sweep angle has been increased to 70° or more.

Such wide sweep angles, when applied to modern tubes having relatively flat viewing faces, result in a degradation of focus outside of the central viewing area normally encompassed by a sweep of 50° or so. Thus with respect to the horizontal line structure of the picture, the side portions of the picture are out of focus when the central area of the picture is in proper focus. To correct such condition it would be necessary to modulate the focal length of the cathode beam in accordance with the horizontal sweep of the beam such that the focal length would be increased when the beam is horizontally deflected towards the side edges of the picture tube.

Horizontal deflection circuits commonly in use employ a plurality of stages including synchronizing signal stages, horizontal oscillator and driver stages controlled by the synchronizing signals, and the horizontal sweep power output stage or stages. In addition, the picture tube high voltage is usually derived from the horizontal deflection circuits. It is desirable to reduce the number of tubes and components, or circuit stages, without affecting picture quality.

The number of stages in the amplifier circuits should not be reduced since this might impair sensitivity. Simplification of the deflection circuits, on the other hand provides an excellent means of reducing the complexity of a television receiver without impairing picture quality.

An object of the present invention is to provide an improved horizontal sweep circuit and focus control for a television receiver.

Another object of the invention is to provide an improved horizontal sweep circuit including a self oscillating output stage that does not require a separate oscillator stage.

A further object of the invention is to provide a circuit for dynamically controlling the electron beam focus of the picture tube in accordance with the horizontal deflection of the electron beam.

Still another object of the invention is to provide a dynamic control of cathode ray focus length in accordance with the horizontal sweep signal, the provision of the dynamic focus control further enabling the use of a self oscillating horizontal sweep power output stage.

A feature of this invention is the provision of a horizontal sweep power output stage having controlled composite regenerative feedback which renders the stage self oscillating. In order to obtain horizontal stability in the absence of synchronizing signal pulses the composite feedback signal is formed of a pulse signal derived from the pulse output of the horizontal output tube combined with a sine wave signal derived from the horizontal deflection coil circuit.

An important feature of the invention is the provision of a horizontal deflection system having a resonant circuit tuned to the horizontal frequency coupled to the horizontal deflection coils, and which provides signals for dynamic focusing of the cathode ray beam and also feedback for sustaining oscillations in the deflection system.

Another feature of the invention is the provision of a focus system for a cathode ray tube including means producing a steady focus field and an auxiliary winding supplied with varying focus current having a frequency of variation equal to the horizontal sweep frequency of the cathode ray and related in phase to the horizontal sweep signal such that the focal length of the cathode ray is increased for the maximum horizontal deflections of the ray to either side of its central position.

Still another feature of the invention is the system for providing a varying amplitude focus coil current in an auxiliary dynamic focus coil winding connected in series with the horizontal deflection coil, and with the auxiliary focus coil winding forming the inductance of a tuned circuit resonating at the sweep frequency to thus provide a signal which may be used as a component of the composite regenerative feedback signal for the self oscillating sweep power output stage.

Further objects, features, and advantages of the invention will be apparent with reference to the following specification and the accompanying drawings, in which.

In practicing the invention a horizontal sweep power output stage of a television receiver is provided, and this stage is made self oscillatory by applying a regenerative feedback signal of the proper phase and wave form to the control grid of the tube thereof. Such power output tube is usually of the tetrode or pentode type. According to the invention, the feedback signal is a composite signal formed by the combination of a sawtooth voltage wave from the output circuit of the horizontal sweep output tube, together with a sine wave formed by a tuned circuit in series with the horizontal sweep deflection coil and resonating at the horizontal sweep frequency.

The tuned circuit in the feedback path assures stability of the sweep frequency and prevents tear-out in the absence of synchronizing signals. The resonant circuit for producing the sine wave regenerative feedback signal may be formed of a series tuned condenser and inductance connected in the return path of the horizontal sweep deflection coil so that the negative pulses occurring in the deflection circuit at the sweep frequency are transformed to sine wave potential variations of the proper phase for application as a regenerative feedback signal to the control grid of the self oscillating horizontal sweep power output tube.

To obtain dynamic focus control of the electron beam of the picture tube in accordance with the horizontally swept position of the beam, a focus control signal varying with a sine or co-sine variation at the horizontal sweep frequency must be applied to the picture tube in such manner as to dynamically control the focal length of the electron beam. Such dynamic focus signal is obtained according to the invention by means of the resonant circuit tuned to the horizontal sweep frequency and responsive to the horizontal sweep signal in the return path of the deflection coils. Such resonant circuit may be the same resonant circuit described in the preceding paragraph in connection with the formation of a sine wave component in the feedback signal for the sweep oscillator. The dynamic focus control signal may be applied as either a varying potential for electrostatically focussed tubes or a varying current for magnetically focussed picture tubes. The inductance element of a resonant circuit coupled to the deflection yoke circuit may be used as a dynamic focus coil for varying the focal length of magnetic or electric lens of the picture tube. For example, an electrostatically focussed picture tube may be provided with a small auxiliary dynamic focus coil secured on the neck of the tube in the vicinity of the electrostatic focussing lens and connected to the sweep circuit as previously described.

Figure 1:
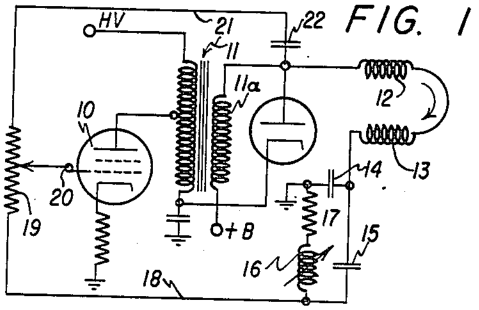
Fig. 1 is a schematic diagram of a self oscillating horizontal sweep stage of the invention having a feedback circuit providing composite regenerative feedback.

For a detailed description of the present invention, together with a specific disclosure of several embodiments thereof, reference is made to the drawings in which Fig. 1 shows a self oscillating horizontal sweep power output stage comprising the power output tube 10, horizontal sweep output transformer 11 and horizontal deflection coil windings 12 and 13. The return of the horizontal deflection signal to ground is interrupted by the condenser 14 and a series resonant circuit consisting of the condenser 15, variable tuned inductance 16, and resistor 17. A regenerative feedback voltage having sine wave variations at the horizontal sweep frequency is thus developed in line 18 and applied through potentiometer 19 to the control grid 20 of the horizontal sweep output tube 10. A second regenerative feedback voltage consisting of sawtooth pulses at the horizontal sweep frequency is applied to the control grid 20 through the potentiometer 19 from the line 21 and condenser 22 connected to the output winding of the horizontal sweep output transformer 11.

Figure 2:
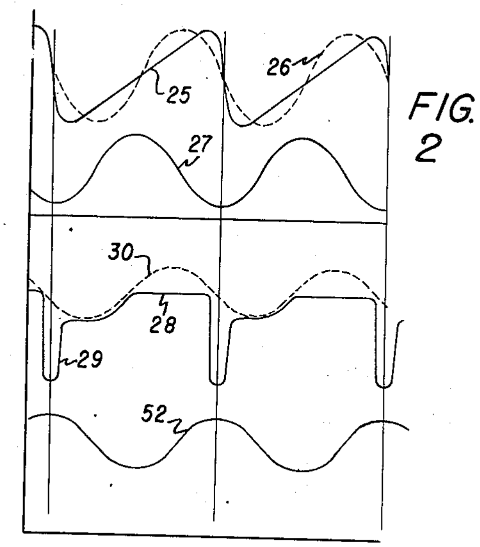
Fig. 2 shows representative wave forms of the signals in various parts of the circuit of Fig. 1.
Figure 7:
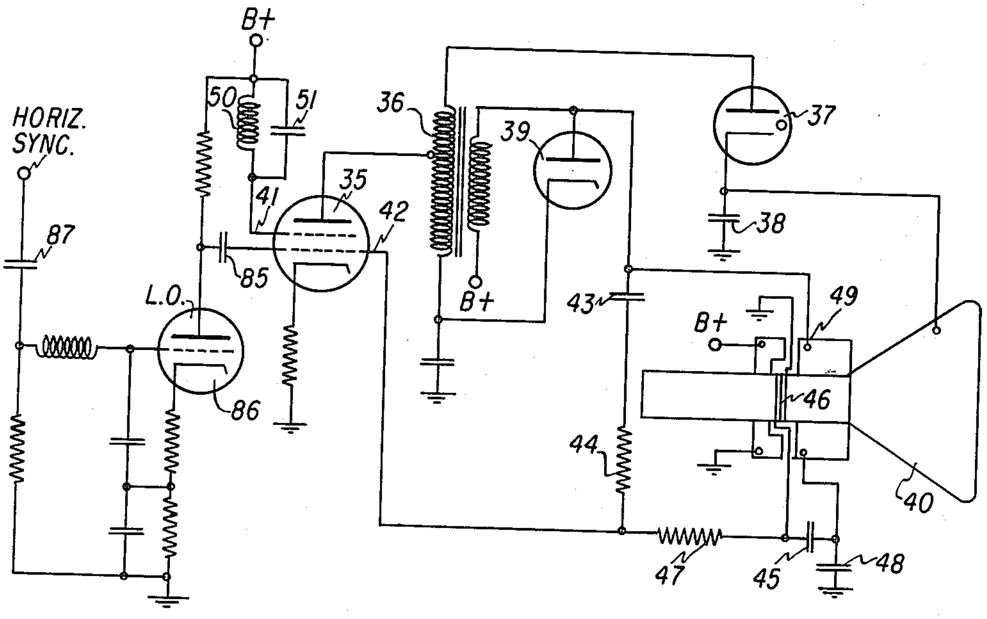
Fig. 7 is a combined schematic and diagrammatic representation of a self oscillating horizontal sweep power output stage coupled to a locked oscillator synchronizing stage.

The circuit as described in connection with Fig. 1 is self oscillating and has some of the features of a flywheel oscillator and therefore requires no separate oscillator. Referring to Fig. 2 of the drawings the sweep current circulating in the deflection coils 12 and 13 is shown by the curve 25 along with its fundamental sine wave as shown by the dotted line curve 26. The series resonant circuit comprising the condenser 15, inductance 16 and coupling reactance 14 carries a circulating current as shown by the curve 27. If the coupling element 14 is a reactance as shown, the circulating current is a co-sine wave and is substantially 90° out of phase with the sweep current fundamental waveform shown by curve 26. This current is therefore usable as a dynamic focus current in the circuits to be described in connection with Figs. 3, 4 and 7 of the drawings. The waveform of the composite regenerative feedback voltage applied to the control grid 20 is represented by the curve 28. It is composed of a strong negative pulse portion 29 fed back through condenser 22 and potentiometer 19 and of a sine wave 30 as obtained in the ringing circuit comprising the condenser 15 and inductance 16. The sine wave 30 lags the fundamental component of the pulse wave 29 by 90° as is shown in Fig. 2. It should be mentioned that the strong negative pulse signal 29 is derived from the booster winding 11a and mixed with the ringing circuit by potentiometer 19 in suitable proportions (about 1 to 1). The addition of a "ringing" wave to the pulse feedback contributes materially to horizontal sweep frequency stabilization and noise immunity and thus to smoothness of vertical lines in the picture. The sine wave defines the end of a line by passing through zero in a negative direction and it also locks several lines by virtue of resonance.

Figure 3:
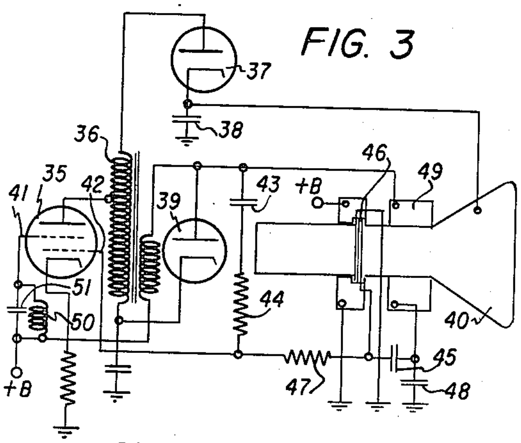
Fig. 3 is a combined schematic and diagrammatic view of a self oscillating sweep power output stage also providing dynamic focus of the beam of a cathode ray tube.

With reference to Fig. 3 a self sustained horizontal sweep oscillator circuit similar to Fig. 1 is shown in combination with a dynamic focus control for a picture tube. The sweep oscillator tube 35 is connected to the horizontal output transformer 36 through the efficiency diode 39, and the high voltage rectifier tube 37 and its filter condenser 38 are provided to furnish high voltage for the picture tube 40. The sweep oscillator tube 35 is of the tetrode type having a screen grid 41 and a control grid 42. The control grid 42 is provided with a regenerative composite feedback signal comprising the pulse feedback signal applied through condenser 43 and resistor 44, together with the sine wave voltage applied through the resistor 47 from the ringing circuit consisting of condenser 45 and dynamic focus coil 46. It will be noted that the dynamic focus coil 46 and condenser 45 form a series tuned circuit coupled to the yoke circuit by a condenser 48. This coupling element forms a ground return of the sweep current through the deflection coil 49 which is in turn connected to the output winding of the horizontal sweep output transformer 36.

As previously mentioned in connection with curve 27 of Fig. 2, the circulating current in the auxiliary focus coil winding 46 is of the desired phase to provide a dynamic control of the focal length of the electron beam in accordance with the horizontally swept position of the beam.

The phase relation of the current in the winding 46 with respect to the fundamental of the sweep current (curve 26) may, of course, be controlled by the tuning of the resonant of ringing current. The arrangement of Fig. 3 also provides an additional feature in that the B plus supply for the screen grid 41 of the sweep oscillator tube 35 passes through a tuned circuit consisting of the inductance 50 and condenser 51 tuned to resonate at the horizontal sweep frequency. The voltage appearing across the tuned circuit consisting of the inductance 50 and condenser 51 is shown in curve 52 of Fig. 2 in relation to the timing of the sweep current. The phase of the screen voltage so provided may be adjusted by the tuning of the circuit. The second half of the wave shown by the curve 52 causes the screen voltage to rise toward the end of the sweep pulse and produces a stretching effect at the right end of the picture which tends to overcome a familiar type to sweep distortion.

Figure 4:
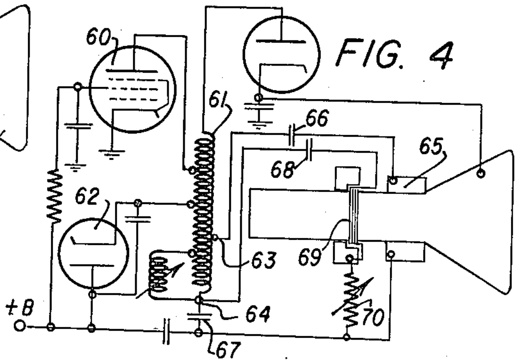
Fig. 4 illustrates another embodiment of the invention in which dynamic focus is provided.

Referring to Fig. 4 of the drawings a circuit is shown for providing a dynamic focus control in connection with a conventional form of horizontal sweep amplifier not having composite feedback and sustained oscillation features. The sweep amplifier tube 60 is connected to the horizontal sweep transformer 61 having an efficiency diode 62 connected thereto in a conventional manner. The sweep output appears across terminals 63 and 64 and is connected to the horizontal deflection coil 65 through condensers 66 and 67. A series resonant circuit consisting of the condenser 68, the auxiliary dynamic focus coil 69 and the rheostat 70 are connected in parallel with the condenser 67. The circulating current through coil 69 is then the proper phase to provide dynamic focus control as described in connection with the curve 27 of Fig. 2.

Figure 5:
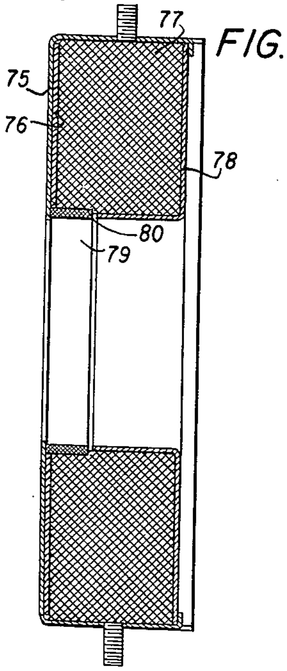
Fig. 5 is a cross section of a focus coil including an auxiliary dynamic focus coil.
Figure 6:
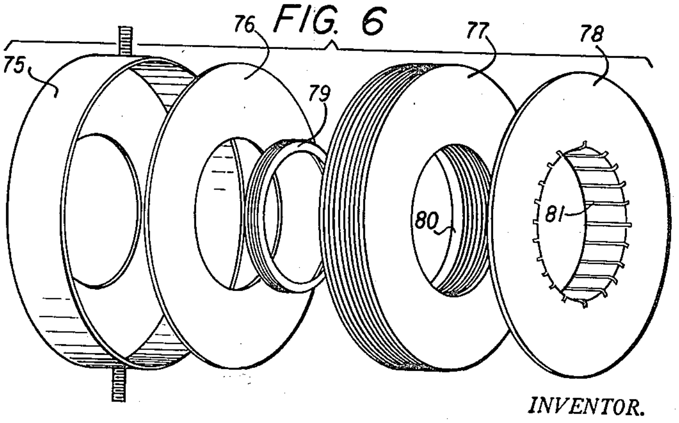
Fig. 6 is an exploded view of the focus coil shown in Fig. 5.

Figs. 5 and 6 shown some structural detail of a modified magnetic focus coil having an auxiliary dynamic focus winding therein. The conventional focus coil consists of the metallic can 75 enclosing the magnetic pole 76, main focus coil winding 77 and magnetic pole 78. The auxiliary dynamic focus winding is shown at 79 and the core sections of the magnetic pole 78 are cut back at 80 to provide space for insertion of the auxiliary dynamic focus coil winding 79. It should be noted that the dynamic focus coil winding 79 is intended to apply auxiliary focussing effects on the electron beam of the picture tube which vary at the horizontal sweep frequency which is conventionally 15,750 cycles per second. To form an auxiliary dynamic focus coil winding which will resonate efficiently at the horizontal sweep frequency in a magnetic structure such as the conventional magnetic focussing coil, it is necessary to copper plate the inside of the magnetic poles 76 and 78 and to slot the core portions of the pole 78 in order to reduce hysteresis losses at such relatively high frequencies as the horizontal sweep frequency. The slotted core portions of the magnetic pole 78 are shown at 81.

Referring back to Figs. 3 and 4 of the drawings it should be pointed out that each of the auxiliary focus windings 46 and 69, respectively, may be embodied in a main focus coil structure such as described in connection with Figs. 5 and 6 of the drawings.

In connection with the self oscillating horizontal sweep output circuits described in Figs. 1 and 3 of the drawings, it should be mentioned that conventional synchronizing pulses as obtained from the sync separator stages of the television receiver circuit may be applied to the control grid of the self sustained sweep oscillator along with the composite regenerative feedback signal which has been described in detail. Such arrangement provides very satisfactory results and assures even horizontal line structure in moderately strong signal areas and in the absence of any strong noise signals. However, it will be understood that the application of synchronizing signals directly to the sweep oscillator forms a circuit that is sensitive to noise signals for every horizontal line in the structure of the picture. The arrangement shown in Fig. 7 of the drawings provides greater stability and horizontal synchronization for weak signals and high noise levels. The circuit is in most respects similar to that of Fig. 3 of the drawings and those elements of the circuit which are identical and perform the same function will be given the same reference numeral and not further described except as necessary for an understanding of this embodiment. It will be noted that the control grid 42 of the sweep oscillator tube 35 is connected by the condenser 85 to the plate electrode of a locked oscillator tube 86. The control grid and cathode electrodes of the locked oscillator tube 86 are connected in a colpitts oscillator circuit modified to be locked to the frequency of the horizontal synchronization pulses appearing through condenser 87 from the horizontal sync separator (not shown) of the television receiver. The flywheel effect of the locked oscillator tube 86 provides a filtered and stabilized synchronizing signal to the sweep oscillator 35 which is effectively protected from noise disturbance. For a more detailed understanding of the operation of a locked oscillator for television horizontal sweep synchronization reference may be made to the January 1949 issue of Electronics, pages 112 through 117.

Figure 8:
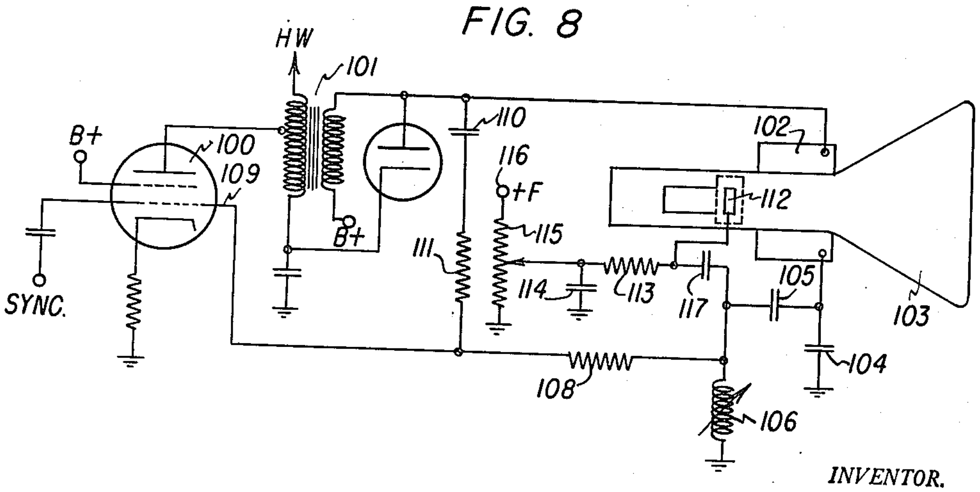
Fig. 8 shows an embodiment of the invention for use with an electrostatically focussed picture tube.

The invention thus far has been described in connection with applications for use with magnetically focussed picture tubes. A modified form of the invention for use with electro-statically focussed picture tubes is shown in Fig. 8 of the drawings. A sweep oscillator 100 is connected to the horizontal output transformer 101 whose output winding is connected to the horizontal deflection coil 102 of the electrostatically focussed picture tube 103. The return path of the sweep current in the deflection coil 102 is interrupted by the condenser 104 and a series tuned circuit consisting of the condenser 105 and the inductance 106 is connected across the condenser 104. The series tuned circuit consisting of the condenser 105 and inductance 106 is designed to resonate at the horizontal sweep frequency and the sine wave voltage appearing across inductance 106 is connected by the resistor 108 as a regenerative feedback signal to the control grid 109 of the sweep oscillator tube 100. Negative pulse feedback is applied through the condenser 110 and the resistor 111 to the control grid 109 so that a composite regenerative feedback signal as previously described is provided to make the horizontal sweep amplifier circuit self oscillatory. An electrostatic focussing potential for the focussing electrode 112 of the picture tube 103 is taken off the inductance 106 through coupling condenser 117. The fixed focussing bias is taken from divider 115 through high impedance resistor 113, being bypassed by condenser 114. The varying voltage wave appearing across the inductance 106 is thus connected by the condenser 117 to the focussing electrode 112 of the electrostatically focussed picture tube 103 to thus provide a dynamic focus control in accordance with the horizontally swept position of the beam.

In the foregoing a self sustaining horizontal sweep oscillator circuit has been described, the arrangement being such that a composite regenerative feedback signal consisting of a pulse and a sine wave is used to obtain good stability of sweep frequency and phase. The invention has also disclosed an arrangement for providing a dynamic control of the focal length of the electron beam of a picture tube in accordance with the position of the beam. The circuit elements providing the dynamic focus control are also used to provide a sine wave component for the feedback voltage in the sweep oscillator. Variations of the invention have also been described to show the application thereof for use with the electrostatically focussed picture tubes. It is to be noted that an auxiliary dynamic focus coil may be used with electrostatically focussed tubes in which case the steady focus is provided by an electrostatic field and the dynamic focus by an electromagnetic field. The dynamic focus may also be used in systems in which the steady focus is provided by a magnetic field produced by permanent magnet structure. The combination of the self oscillating sweep circuit with locked oscillator synchronizing signal circuits, where difficulties from high noise and low signal levels may be encountered has been found to provide highly stable synchronization with a minimum of equipment.

It should be obvious that many variations of the invention may be made without departing from the spirit of the invention and the scope of the appended claims.

I claim:

1. In a television receiver having a cathode ray picture tube, a self oscillating horizontal sweep power output stage including in combination, a horizontal sweep power output tube having control grid and plate electrodes, a horizontal sweep output transformer connected to the plate electrode of said tube, said transformer having output terminals, horizontal deflection coil means for deflecting the ray of said picture tube, a resonant circuit tuned to the horizontal sweep frequency, means connecting said resonant circuit and said deflection coil means in series across said output terminals, a first regenerative feedback path connecting the pulse voltage in said transformer to said control grid of said tube, and a second regenerative feedback path connecting the sine wave voltage developed in said resonant circuit to said control grid of said tube to thus provide a composite regenerative feedback and cause the output stage to be self-oscillatory.

2. In a television receiver having a cathode ray picture tube, a self oscillating horizontal sweep power output stage having, in combination, a horizontal sweep power output tube including control grid and plate electrodes, a horizontal sweep output transformer connected to the plate electrode of said tube, said transformer having output terminals, horizontal deflection coil means for providing horizontal deflection of the cathode ray of said picture tube, a resonant circuit tuned to the horizontal sweep frequency, said resonant circuit and said deflection coil means being connected in series across said output terminals, a regenerative feedback circuit including a first path connecting the pulse voltage in said transformer to the control grid of said tube and a second path connecting the sine wave voltage developed in said resonant circuit to the control grid of said tube, said resonant circuit being adapted to form a magnetic focussing field adjacent the beam of said picture tube which varies with the current developed in said resonant circuit to thereby provide a variation of focal length of the beam of said picture tube in accordance with the horizontal position thereof.

3. In a television receiver having a picture tube, a horizontal sweep power output stage having in combination, a horizontal sweep power output tube, said tube having control grid and plate electrodes, a horizontal sweep output transformer connected to the plate electrode of said tube, said output transformer having output terminals, horizontal deflection coil means for said picture tube, a resonant circuit tuned to the horizontal deflection frequency, said resonant circuit and said deflection coil means being connected in series across said output terminals, means applying the sine wave current developed in said resonant circuit to modify the focus of said picture tube to thereby provide a variation of focal length of the electron beam of said picture tube in accordance with its horizontally swept position.

4. In a television receiver having a picture tube, a self oscillating horizontal sweep power output stage, including in combination, a horizontal sweep power output tube, said tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, a first regenerative feedback path connecting the pulse voltage in said transformer to the control grid of said tube, a second regenerative feedback path connecting the sine wave voltage developed in said resonant circuit to the control grid of said tube, said resonant circuit comprising a coil and a condenser, said coil being arranged as an auxiliary focus coil for said picture tube whereby the current developed in said coil is effective to provide a variation of focal length of the electron beam of said picture tube in accordance with its horizontally swept position.

5. In a television receiver having a picture tube, a horizontal sweep power output stage, including in combination, a horizontal sweep power output tube, said tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, said resonant circuit comprising a coil and a condenser, said coil being arranged as an auxiliary focus coil for said picture tube whereby the sine wave current developed in said coil provides a variation in focal length in the electron beam of said picture tube in accordance with its horizontally swept position.

6. In a television receiver having an electrostatically focussed picture tube with a focussing electrode, a self oscillating horizontal sweep power output stage, including in combination, a horizontal sweep power output tube, said tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, a first regenerative feedback path connecting the pulse voltage in said transformer to the control grid of said tube, a second regenerative feedback path connecting the sine wave voltage developed in said resonant circuit to the control grid of said tube, means connecting the voltage developed in said resonant circuit to the focussing electrode of said picture tube to thereby provide a variation of focal length of the electron beam of said picture tube in accordance with its horizontally swept position.

7. In a television receiver having an electrostatically focussed picture tube with a focussing electrode, a horizontal sweep power output stage having in combination, a horizontal sweep power output tube, said tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, means connecting the sine wave voltage developed in said resonant circuit to the focussing electrode of said picture tube to thereby provide a variation of focal length of the electron beam of said picture tube in accordance with its horizontally swept position.

8. In a television receiver having a picture tube, a self-oscillating horizontal sweep power output stage including in combination, a horizontal sweep power output tube, said tube having control grid and plate electrodes, a horizontal sweep output trasformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, a first regenerative feedback path for the pulse voltage in said transformer, a second regenerative feedback path for the sine wave voltage developed in said resonant circuit, means to combine in variable proportions said first and second regenerative feedback paths, and means to connect the proportionally combined regenerative feedback paths to the control grid of said tube and cause the output stage to be self oscillatory.

9. In a television receiver having a picture tube, a self-oscillating horizontal sweep output stage, including in combination, a horizontal sweep power output tube, said tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, a first regenerative feedback path connected to the pulse voltage in the output winding of said transformer, a second regenerative feedback path connected to the sine wave voltage developed in said resonant circuit, means to combine in variable proportions said first and second regenerative feedback paths and to connect the combined regenerative feedback paths to the control grid of said tube, means applying the sine wave current developed in said resonant circuit being to modify the focus of said picture tube to thereby provide a variation of focal length of the electron beam of said picture tube in accordance with its horizontally swept position.

10. In a television receiver having a picture tube, a self-oscillating horizontal sweep power output stage, including in combination, a horizontal sweep output tube, said tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, a first regenerative feedback path connected to the pulse voltage in said transformer, a regenerative second feedback path connected to the sine wave voltage developed in said resonant circuit, means to combine in variable proportions said first and second regenerative feedback paths, means to connect the combined regenerative feedback paths to the control grid of said tube, said resonant circuit comprising a coil and a condenser, said coil being arranged as an auxiliary focus coil for said picture tube whereby the sine wave current developed in said coil provides a variation of focal length of the electron beam of said picture tube in accordance with its swept position.

11. In a television receiver having an electrostatically focussed picture tube with a focussing electrode, a self oscillating horizontal sweep power output stage, including in combination, a horizontal sweep power output tube, said tube having control grid and plate electrodes, a horizontal sweep output transformer connected to the plate electrode of said tube, said transformer having output terminals horizontal sweep deflection coil means for said picture tube, a resonant circuit tuned to the horizontal sweep frequency, said resonant circuit and said deflection coil means being connected in series across said output terminals, a first regenerative feedback path connected to the pulse voltage in said transformer, a second regenerative feedback path connected to the sine wave voltage developed in said resonant circuit, means to combine in variable proportions the feedback voltages in said first and second feedback paths, means to connect the combined feedback voltages to the control grid of said tube, means connecting the sine wave voltage developed in said resonant circuit to the focussing electrode of said picture tube to thereby provide a variation of focal length of the electron beam of said picture tube in accordance with its horizontally swept position.

12. In a television receiver having a picture tube and synchronization pulse separating circuits, a self oscillating horizontal sweep power output stage having in combination, a horizontal sweep power output tube, said tube including control grid and plate electrodes, a horizontal sweep output transformer connected to the plate electrode of said tube, said transformer having output terminals, horizontal deflection coil means for said picture tube, a resonant circuit tuned to the horizontal sweep frequency, means connecting said resonant circuit and said deflection coil means in series across said output terminals, a first regenerative feedback path connecting the pulse voltage in said transformer to the control grid of said tube, a second regenerative feedback path connecting the sine wave voltage developed in said resonant circuit to the control grid of said tube to thus provide a composite regenerative feedback and cause the output stage including said tube to be self oscillatory, and means to apply the synchronization pulses from said synchronization pulse separating circuits to said control grid to control the oscillations of said output stage in accordance with said synchronization pulses.

13. In a television receiver having a picture tube and synchronization pulse separating circuits, a self oscillating horizontal sweep power output stage, including in combination, a horizontal sweep power output tube, said tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, said resonant circuit and said deflection coil means being connected in series across said output terminals, a first regenerative feedback path for the pulse voltage in said transformer, a second regenerative feedback path for the sine wave voltage developed in said resonant circuit, means to combine in variable proportions said first and second regenerative feedback paths, means to connect the proportionally combined regenerative feedback paths to the control grid of said tube and cause the output stage including said tube to be self oscillatory, and means to apply the synchronization pulses from the synchronization pulse separating circuits to said control grid to control the oscillations of said output stage in accordance with said synchronization pulses.

14. In a television receiver having a picture tube and synchronization pulse separating circuits, a horizontal deflection system including in combination a locked oscillator circuit having input and output terminals, means for applying the synchronization pulses from said separating circuits to said locked oscillator so that said locked oscillator provides regularly spaced pulses in phase with said synchronization pulses, a self-oscillating horizontal sweep power output stage including, a horizontal sweep power output tube having control grid and plate electrodes, a horizontal sweep output transformer connected to the plate electrode of said tube, said transformer having output terminals, horizontal deflection coil means for said picture tube, a resonant circuit tuned to the horizontal sweep frequency, means connecting said resonant circuit and said deflection coil means in series across said output terminals, a first regenerative feedback path connecting the pulse voltage in said transformer to the control grid of said tube, a second regenerative feedback path connecting the sine wave voltage developed in said resonant circuit to the control grid of said tube to thus provide a composite regenerative feedback and cause the output stage including said tube to be self oscillatory, and means coupling said control grid to said locked oscillator to control the oscillations of said output stage in accordance with the pulse output of said locked oscillator.

15. In a television receiver having a picture tube, a self-oscillating horizontal sweep power output stage including in combination, a horizontal sweep power output tube, said tube including control grid, screen grid, and plate electrodes, means connecting said screen grid electrode to a source of potential and forming a resonant circuit at the horizontal sweep frequency, a horizontal sweep output transformer connected to said plate electrode of said tube, said transformer having output terminals, horizontal deflection coil means for said picture tube, a resonant circuit tuned to the horizontal sweep frequency, means connecting said resonant circuit and said deflection coil means in series across said output terminals, a first regenerative feedback path connecting the pulse voltage in said transformer to the control grid of said tube, and a second regenerative feedback path connecting the sine wave voltage developed in said resonant circuit to the control grid of said tube to thus provide a composite regenerative feedback voltage and cause the output stage including said tube to be self oscillatory.

16. In a television receiver having a magnetically focussed and deflected cathode ray picture tube, a self oscillating horizontal sweep power output stage, including in combination, a horizontal sweep power output tube, said tube having a control grid and plate electrodes, a horizontal sweep output transformer connected to the plate electrode of said tube, said transformer having output terminals, horizontal deflection coil means for said picture tube, focus coil means for said picture tube, said focus coil means having a primary focus coil winding and a second auxiliary focus coil winding, said focus coil means including copper plated pole pieces, said pole pieces having a portion thereof slotted to reduce hysteresis losses, a resonant circuit tuned to the horizontal sweep frequency, said resonant circuit and said deflection coil means being connected in series across said output terminals, a first regenerative feedback path connecting the pulse voltage in said transformer to the control gird of said tube, a second regenerative feedback path connecting the sine wave voltage developed in said resonant circuit to the control grid of said tube, said resonant circuit comprising said auxiliary focus coil and a condenser, whereby the sine wave current developed in said coil is effective to provide a variation of focal length of the electron beam of said picture tube in accordance with its horizontally swept position.

17. In a television receiver including a magnetically deflected picture tube, deflection coils therefor adapted to receive a sawtooth current wave therein, and means for deriving synchronization pulses for controlling the deflection produced by the coil; a self oscillating horizontal deflection output stage for producing a sawtooth current wave having trace and retrace portions including in combination, an output tube including at least one grid electrode and a plate electrode, rectifier means, a coupling circuit connecting the deflection coils to said plate electrode and to said rectifier means, said coupling circuit including inductance means and resonant circuit means tuned to the horizontal deflection frequency, a regenerative feedback circuit including a first portion connected to said inductance means for deriving a pulse voltage wave therefrom with the pulses occurring during the retrace portions of said sawtooth wave, said feedback circuit including a second porttion connected to said resonant circuit means for deriving a sine wave voltage therefrom which lags the fundamental component of said pulse voltage wave by 90°, said feedback circuit including a portion connected to a grid electrode of said tube for applying said pulse voltage and said sine wave voltage in combination thereto for sustaining oscillations in said tube, and means for applying the synchronization pulses to a grid electrode of said tube for synchronizing said oscillations in said tube therewith.

18. In a television receiver including a magnetically deflected picture tube, deflection coils therefor adapted to receive a sawtooth current wave therein, and means for deriving synchronization pulses for controlling the deflection produced by the coil; a self oscillating horizontal deflection output stage for producing a sawtooth current wave having trace and retrace portions including in combination, an output tube including a control grid electrode, a screen grid electrode, and a plate electrode, a source of potential, rectifier means, a coupling circuit connecting the deflection coils to said plate electrode and to said rectifier means, said coupling circuit including inductance means and resonant circuit means tuned to the horizontal deflection frequency, a regenerative feedback circuit including a first portion connected to said inductance means for deriving a pulse voltage wave therefrom with the pulses occurring during the retrace portions of said sawtooth wave, said feedback circuit including a second portion connected to said resonant circuit means for deriving a sine wave voltage therefrom which lags the fundamental component of said pulse voltage wave by 90°, said feedback circuit including a portion connected to said control grid electrode of said tube for applying said pulse voltage and said sine wave voltage in combination thereto for sustaining oscillations in said tube, second resonant circuit means tuned to the horizontal deflection frequency connecting said screen grid to said source of potential, and means for applying the synchronization pulses to said control grid electrode of said tube for synchronizing said oscillations in said tube therewith.

19. In a television receiver including a magnetically deflected picture tube, deflection coils therefor adapted to receive a sawtooth current wave therein, and means for deriving synchronization pulses for controlling the deflection produced by the coil; a self oscillating horizontal deflection output stage for producing a sawtooth current wave having trace and retrace portions including in combination, an output tube including at least one grid electrode and a plate electrode, rectifier means, a coupling circuit connecting the deflection coils to said plate electrode and to said rectifier means, said coupling circuit including inductance means and resonant circuit means tuned to the horizontal deflection frequency, said resonant circuit means including condenser means and dynamic focus coil means connected in series with said condenser means applying a voltage to said focus coil means, a regenerative feedback circuit including a first portion connected to said inductance means for deriving a pulse voltage wave therefrom with the pulses occurring during the retrace portions of said sawtooth wave, said feedback circuit including a second portion connected to said focus coil means of said resonant circuit means for deriving a sine wave voltage therefrom which lags the fundamental component of said pulse voltage wave by 90°, said feedback circuit including a portion connected to a grid electrode of said tube for applying said pulse voltage and said sine wave voltage in combination thereto for sustaining oscillations in said tube, and means for applying the synchronization pulses to a grid electrode of said tube for synchronizing said oscillations in said tube therewith.

KURT SCHLESINGER.

References Cited in the file of this patent

UNITED STATES PATENTS

| Number | Name | Date |
|---|---|---|
| 2,220,303 | Tingley | Nov. 5, 1940 |
| 2,543,305 | Schwarz | Feb. 27, 1951 |
| 2,545,346 | Edelsohn | Mar. 13, 1951 |
| 2,584,213 | Longo et al. | Feb. 5, 1952 |

OTHER REFERENCES

Rider Television Manual, vol. 3 Bendix pages 3–28. (Copy in U. S. Patent Office Scientific Library.)

Electronics Jan. 1949, pp. 112–117. (Copy in U. S. Patent Office Scientific Library.)